United States Patent [19]
Aldrich

[11] Patent Number: 5,802,824
[45] Date of Patent: Sep. 8, 1998

[54] PORTABLE POWERED GRASS WHIP AND A NOVEL FREE-MOVING BRACKET FOR MOUNTING THE SAME TO RIDING EQUIPMENT

[75] Inventor: Steven H. Aldrich, Hope, Mich.

[73] Assignee: Keyboard Comfort, Inc., Midland, Mich.

[21] Appl. No.: 949,256

[22] Filed: Oct. 13, 1997

[51] Int. Cl.⁶ .................................................. A01D 34/00
[52] U.S. Cl. ............................ 56/13.7; 56/12.7; 56/13.6; 56/DIG. 9
[58] Field of Search .................................... 56/12.1, 12.7, 56/13.5, 13.6, 13.7, 13.8, 16.7, 16.9, DIG. 9; 30/276; 172/15

[56] References Cited

U.S. PATENT DOCUMENTS

| | | |
|---|---|---|
| 4,170,099 | 10/1979 | Owens . |
| 4,869,056 | 9/1989 | Lynch .......................................... 56/15.2 |
| 4,949,534 | 8/1990 | Evans . |
| 4,949,536 | 8/1990 | Neufeld . |
| 5,167,108 | 12/1992 | Bird ............................................. 56/13.7 |
| 5,303,532 | 4/1994 | Phillips ....................................... 56/12.7 |
| 5,561,969 | 10/1996 | Sandy .......................................... 56/13.6 |
| 5,694,752 | 12/1997 | Warfield, III ............................... 56/13.6 |

*Primary Examiner*—Terry Lee Melius
*Assistant Examiner*—Robert Pezzuto
*Attorney, Agent, or Firm*—Robert L. McKellar

[57] ABSTRACT

A portable, powered grass whip and a novel free-moving bracket for mounting the same to riding equipment such as a lawn mower. Also, a combination of a new and novel grass whip in combination with a portable power pack.

8 Claims, 8 Drawing Sheets

PORTABLE POWERED GRASS WHIP AND A NOVEL FREE-MOVING BRACKET FOR MOUNTING THE SAME TO RIDING EQUIPMENT

This invention deals with a portable, powered grass whip and a novel free-moving bracket for mounting the same to riding equipment such as a lawn mower, or the like.

More specifically, this invention deals with a portable, powered grass whip mounted in a novel free-moving bracket for mounting on the shroud of a piece of riding lawn equipment so that grass and weeds can be trimmed without dismounting from the riding lawn equipment. Further, there is provided a portable, powered grass whip and a power source such that when it is desired, or required for the operator to dismount the riding equipment and cut grass or weeds, the power to the grass whip is supplied by a portable battery unit, otherwise, the power to the grass whip when it is mounted on the riding equipment is supplied by the battery of the riding lawn equipment.

BACKGROUND OF THE INVENTION

Primary home care usually requires that one mow or trim a wide variety of vegetation such as grass, weeds, light brush and vines as is found in lawns and adjacent areas and also for cutting vegetation around plants, trees, shrubs, buildings, sidewalks, driveways, and the like. Generally, the grass is cut using a conventional mower, but there is a secondary requirement which includes trimming along the edges of buildings, fences, sidewalks and driveways, which requires the use of motorized grass whip, such grass whips being well-known by those skilled in the art who undertake these chores.

Equipment currently in use for these tasks are heavy, cumbersome, and require skilled operators. Also, there is a certain amount of inefficiency when one has to use two or more pieces of equipment to complete the total mowing and trim project. Further, it would be advantageous if the trimmer and the mower were essentially the same piece of equipment which was essentially controllable by the operator of the mower without complex cable controls, other attachments, and such things as belts, cables, pulleys, sprockets, chains, and the like.

An example of a trimmer that is attachable to the shroud of a mower which has complex cable controls, other attachments, and such things as belts and pulleys, can be found in U.S. Pat. No. 4,170,099, issued Oct. 9, 1979 to Owens. That patent discloses a grass edger and trimmer attachment for a power mower including a vertical trimmer shaft mounted in a bearing fixed to the side of the mower housing. The shaft of the trimmer is driven by a pulley and belt combination which is powered by a mower engine, The attachment includes an arm hinged to the housing which allows the operator to lift the trimmer to a horizontal position or a vertical position to move it out of the way. The disclosed apparatus does not have any mobility with regard to moving the trimmer, except in the above-mentioned positions.

A second patent issued to Evans, U.S. Pat. No. 4,494,534, which issued Aug. 21, 1990, shows a lawn mowing apparatus which is useful with a tractor or an auxiliary apparatus. It requires a trailer to support the apparatus, and even though the trimmer component is movable in a swinging horizontal motion, it can only be moved so by the hand operation of complex sprocket and chain drive, and then only by the direct movement by the operator. In other words, the apparatus is not free-moving.

Yet another apparatus is that found in U.S. Pat. No. 4,494,536, which issued on Aug. 21, 1990 to Neufeld in which there is disclosed a riding lawn mower which has a front mowing attachment to which there is attached a moveable trimmer apparatus. It should be noted that the trimmer is not essentially freely moveable in that each position of each of the moveable portions of the apparatus have to been moved by a Bowden type cable, or by an auxiliary motor mounted on the mowing device.

Finally, with regard to the portable powered grass whip, there is shown in U.S. design Pat. No. 338,676, a power head for a cordless line trimmer, in which a power pack for the trimmer is located beneath the handle of the trimmer.

Thus, what would be desirable would be a simple trimming apparatus that could be attachable to a piece of riding lawn equipment such that the necessary trimming of grass and weeds could be done at the time that the mowing of the grass is being done. Additionally, it would be desirable that the whole apparatus could be simple and free-moving such that it would not be necessary for the operator to be highly trained or skilled in order to operate the apparatus.

Finally, it would be advantageous to have a truly portable, hand held trimmer, that would be lightweight, easy to handle, efficient, and inexpensive to own, and would have the capability of being used independently of the riding equipment, or could be used directly from the riding equipment.

It is therefore an one object of this invention to provide a simple trimming apparatus for attachment to lawn equipment, including riding mowers, push mowers, self-propelled mowers, and the like.

It is a further object of this invention to provide an efficient means to trim vegetation while mowing a lawn. It is yet another object to provide a lightweight portable powered trimming apparatus that can be used on a piece of lawn equipment, but is also useful independent of the lawn equipment.

THE INVENTION

Therefore, this invention deals with a portable, powered grass whip which is lightweight and simple to operate. This invention also deals with a novel free-moving bracket for mounting the portable powered grass whip to riding equipment such as a lawn mower, or the like.

This invention also deals with a combination of the portable, powered grass whip and the novel free-moving bracket mounted on lawn mowing equipment.

More specifically, this invention deals with a bracket for mounting a powered grass whip. The bracket comprises a first base having a linear axis and a top planar surface; a second base; a rotatable arm having a near end, a distal end, and a midpoint; a stanchion, and a spring having a near end and a distal end. The first base includes means to attach the first base to a mower shroud and the first base is attached to and surmounted by a second base, essentially at a right angle to the linear axis of the first base and essentially in the same plane as the top planar surface of the first base.

There is a rotatable arm rotatably surmounted on and detachedly affixed to the second base at the rotatable arm near end. The stanchion is fixedly surmounted on the rotatable arm at or near the rotatable arm distal end, said rotatable arm having surmounted thereon at its distal end, a hollow post. The stanchion has connected to it, the spring, the spring being connected at the spring near end. The distal end of the spring is attached to either the mower shroud or the first base at a point distant from the attachment point of the second base on the first base.

Another embodiment is a powered grass whip which comprises (i) a housing having a shroud and having rotatably mounted within said housing, (ii) a motor to drive a whip, the whip being housed within the shroud.

There is a hollow handle (iii), the handle being mounted on the housing (i), and the handle has a near end and a distal end, and it has mounted thereon, near its near end, an adapter. The hollow handle has a hollow carrying grip mounted on its distal end.

The motor is attached to an electric power source by a first electrical cable, the first electrical cable running from the motor through the hollow handle, and on through the hollow grip and electrically attaching to a switch.

There is a second electrical cable having a near end and a distal end and being electrically attached to the switch at the second electrical cable near end, the distal end of the second electrical cable being capable of attaching to a power source.

The adapter is capable of being detachedly mountable in the hollow post of the rotatable arm.

DETAILED DESCRIPTION OF THE INVENTION

The invention disclosed herein is best understood by a first discussion of the novel components that are used in the lawn mowing and trimmer combination.

Figure 1:
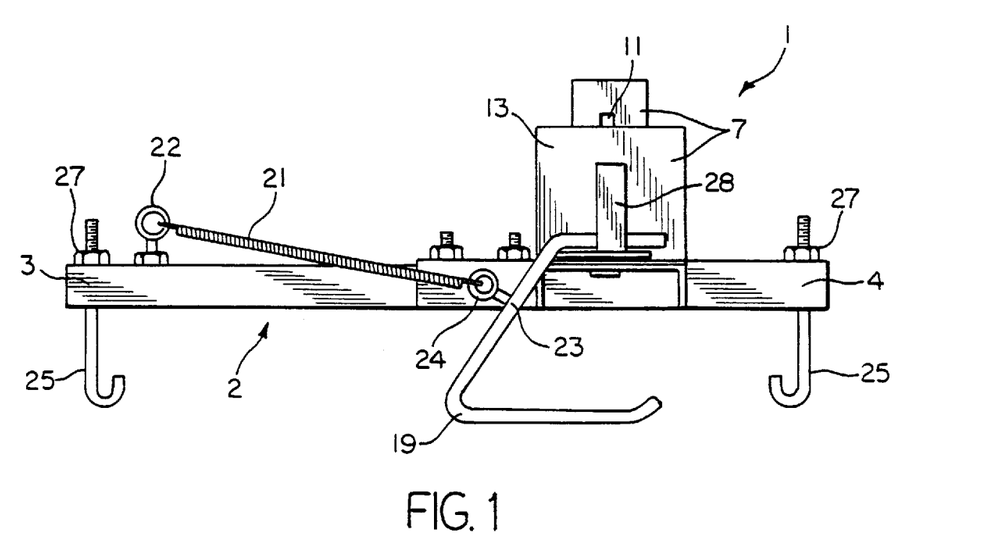
FIG. 1 is a full front view of a novel bracket of this invention.

With reference to FIG. 1 there is shown a full front view of the novel mounting bracket 1 of this invention.

The mounting bracket 1 is intended to be mounted on the top surface of a mower shroud on a lawn mower and for this purpose, the mounting bracket 1 of this invention, and with reference to FIG. 1, there is shown a first base 2, having two pieces 3 and 4 and for purposes of this disclosure. Piece 4 is on the right side of the first base 2, looking at the front view of FIG. 1. Pieces 3 and 4 are structured such that one piece mates with and slides over the top surface of the other. The purpose of having two pieces 3 and 4 in the first base 2 is so that the bracket can be adjusted to fit various sized mower shrouds by sliding one piece, such as piece 4 over piece 3 to shorten or lengthen the first base 2. It should be noted with reference to FIG. 3, that there are a series of holes 5 in the pieces 3 and 4 that will allow fastening when the pieces 3 and 4 are finally adjusted to fit the shroud that is required. Such fastening can be for example by the use of bolts 29 shown in FIG. 3.

Figure 3:
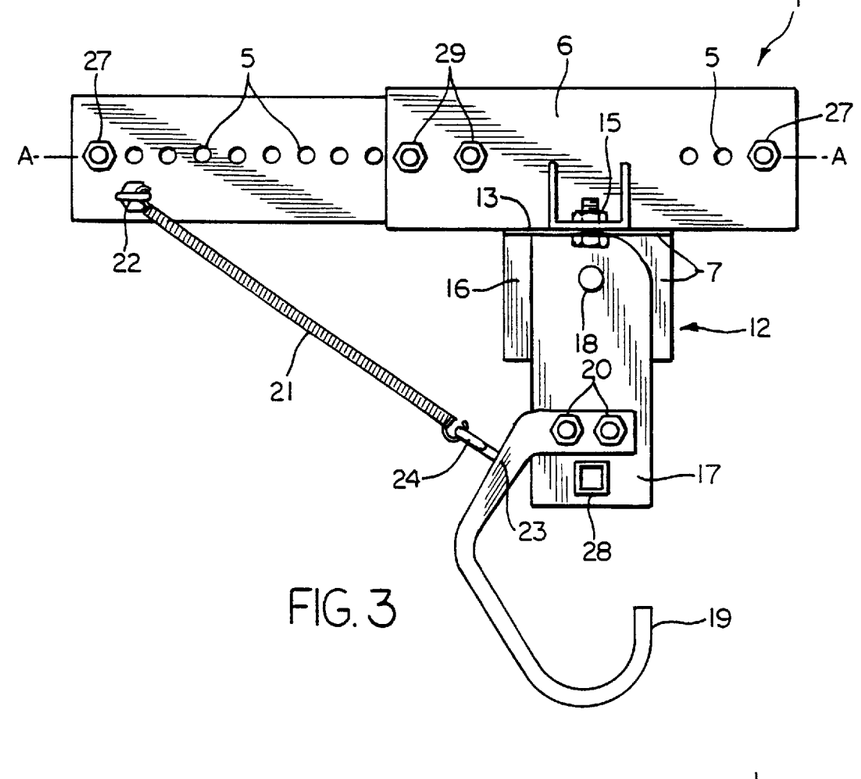
FIG. 3 is a full top view of the bracket of FIG. 1.

For purposes of this disclosure, there is a linear axis for the first base 2 shown as line A—A on FIG. 3. The first base 2 also has a top planar surface 6, which plane is aligned with the planar surface of the drawing paper for purposes of discussion.

Figure 2:
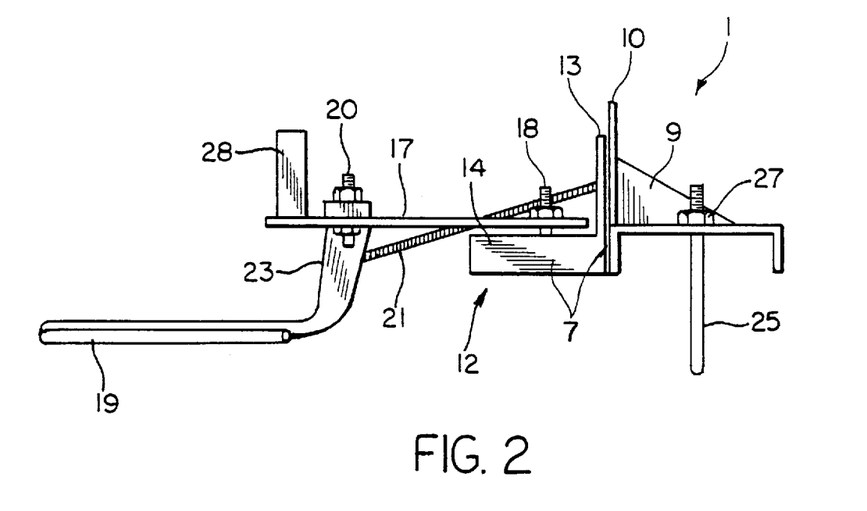
FIG. 2 is a full end view of the bracket of FIG. 1 looking from the right of FIG. 1.

There is a second base 7, which is shown in FIGS. 1, 2, and 3 which also consists of two pieces, a small bracket 8 and a larger support bar 12. The second base 7 is surmounted and attached on the first base at essentially a right angle to the linear axis A—A of the first base 2 and essentially in the same plane as the top planar surface 6 of the piece 4. The second base 7 is attached to the first base 2, by the small bracket. 8, which as can be observed from FIG. 2, has supporting braces 9 at the back thereof and a front plate 10.

The small bracket 8 is welded or bolted to the top planar surface 6 of the piece 4, in order to make it stable and stationery. The front plate 10 has an elongated opening 11 essentially in the center of the front plate 10, a small portion of said opening 11 being visible in FIG. 1, the purpose of which will be set forth infra.

The support bar 12 has a back plate 13 and a horizontal shelf 14 and the back plate 13 has one or more holes (not shown) through it to accommodate bolts 15 which are used to fasten and hold the horizontal shelf 14 to the small bracket 8. The bolts 15 can be loosened and the support bar 12 can be moved vertically to adjust the height of the support bar 12, and thus the height of the grass whip (discussed infra) from the lawn. When the desired height is attained, then the bolts 15 are securely tightened and the horizontal shelf 14 is held sufficiently in place.

With reference to FIG. 2, there is a free-moving rotatable arm 17 surmounted on the top surface 16 of the horizontal shelf 14. The rotatable arm 17 has a near end, and a distal end, and the rotatable arm 17 is attached to the second base 7 at the near end of the rotatable arm 17 by a pin 18.

With reference to FIGS. 1, 2, and 3, there is shown a stanchion 19. The stanchion 19 does not literally support anything in this combination, but serves as a guard for the grass whip discussed infra, and it also serves as the contact bar for surfaces against which the mechanism comes in contact with, such as a tree, or elevated stone, or step, or the like. The stanchion 19 is fixedly attached to the top surface of the rotatable arm 17, and the rotatable arm 17 thus moves in concert with the stanchion 19 when the stanchion 19 is moved. The stanchion 19 can be welded or bolted to attach it to the rotatable arm 17, and for purposes of this disclosure, bolts 20 are shown for that purpose.

There is a spring 21 that is attached to the first base 2, or if desired, it can be attached to the shroud of a mower. The attachment for purposes of this disclosure and this invention is shown at 22 and is an eye bolt that is bolted through a hole (not shown) in piece 3 of the first base 2. The opposite end of the spring 21 is attached to the stanchion 19 at about point 23 and the attachment is shown for purposes of illustration as an eye bolt 24.

FIG. 1 shows one method of attaching the mounting bracket onto the shroud of a mower. There are shown J-hooks 25, which are placed under the bottom edges of the shroud 26 (see FIG. 4). The J-hooks are then tightened by means of the nuts 27 until the mounting bracket is stabilized on the shroud 26.

Referring now to the rotatable arm 17, there is mounted on the distal end of the rotatable arm 17, a hollow post 28, which post is designed to hold the grass whip in place on the mounting bracket 1. The exact nature of this attachment will be set forth below.

Figure 4:
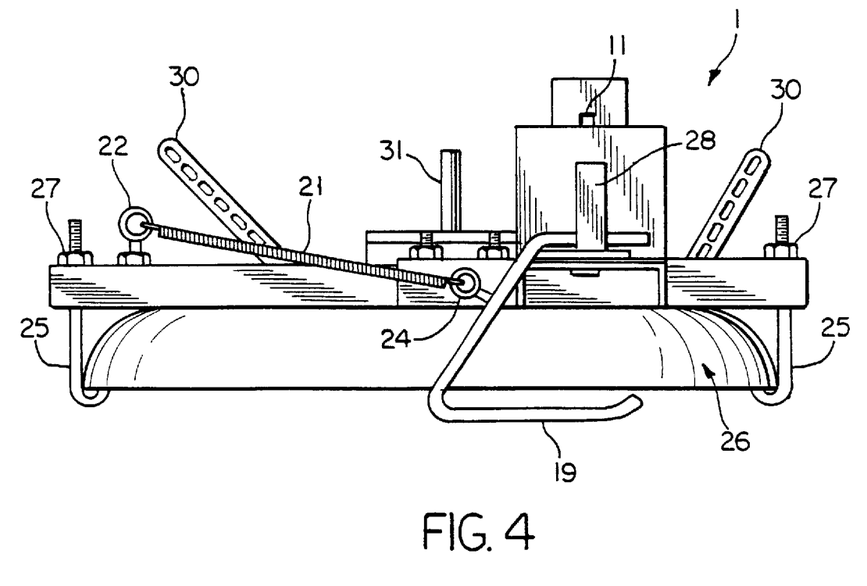
FIG. 4 is a full view from the front, of the bracket of FIG. 1, installed on the shroud of a riding lawn mower.

With reference to FIG. 4, there is shown the combination of the mounting bracket 1 and the mower shroud 26 using the J-hooks 25 tightened using the nuts 27. Also shown for clarity are the supporting and attaching devices 30 for suspending the shroud 26 beneath the center of a tractor, and the drive mechanism for the mower blades(not shown), namely, the drive shaft 31.

Figure 5:
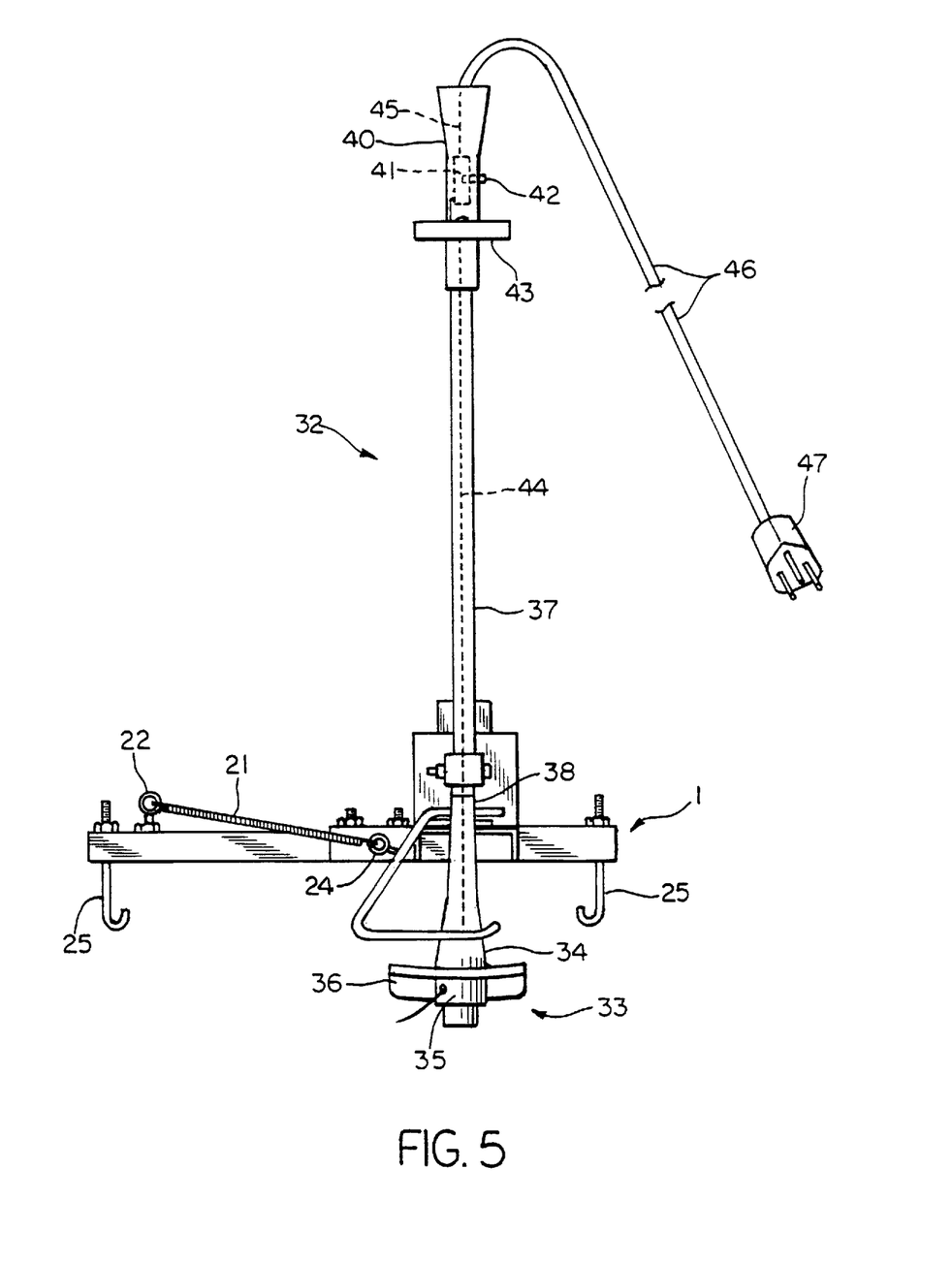
FIG. 5 is a full front view of the combination of the bracket of FIG. 1 and a portable grass whip of this invention.

With reference to FIG. 5, there is shown a mounting bracket 1 of this invention in combination with a grass whip 32. Further, with reference to FIG. 6, there is shown a side view of the apparatus of FIG. 5.

Again, with reference to FIG. 5, and with special attention to the grass whip 32, there is shown a conventional grass whip head generally at 33, in which there is a housing 34, a motor inside the housing 34 (not shown) to drive the whip means 35, and a shroud 36 for the whip means 35. There is further an elongated hollow tube 37, which is fixed into the top 38 of the housing 34 and which forms an elongated hollow shaft for the grass whip 32.

At the distal end 39 of the elongated hollow tube 37, is a hollow handle 40, which handle is detachedly fixed to the elongated hollow tube 37. Housed in the hollow handle 40 is a switch mechanism 41, shown in phantom in FIG. 5, with a safety lock button 42. Also shown is a gripper handle 43 which is used to help balance the grass whip 32 when it is being used and is not in the mounting bracket 1. Further shown in FIG. 5 is an electrical connection 44 which is shown in phantom and which attaches to the motor in the housing 34, runs through the elongated hollow tube 37 to the switch 41. Another electrical connection 45 then runs from the switch 41 to the electrical cord 46, which is terminated in an electrical connection 47. When the electrical connection 47 is connected to a battery, the grass whip 32 is powered and is controlled by the switch 41. When the grass whip 32 is used in the mounting bracket 1 during mowing, and it is desirable to have the grass whip 32 operating, the switch 41 is released to activate the switch 41 and the lock 42 is pressed into the switch 41 to lock it in the on position. The lock 42 is also used to prevent the accidental turning on of the switch 41. It is contemplated within the scope of this invention to use a switch other than the switch 41 to control and operate the grass whip 32. Thus, there can be a switch box wired to the tractor battery 53, which also contains a means by which the electrical connector 47 can also be connected without having to wire the grass whip 32 directly to the tractor battery 53.

Figure 6:
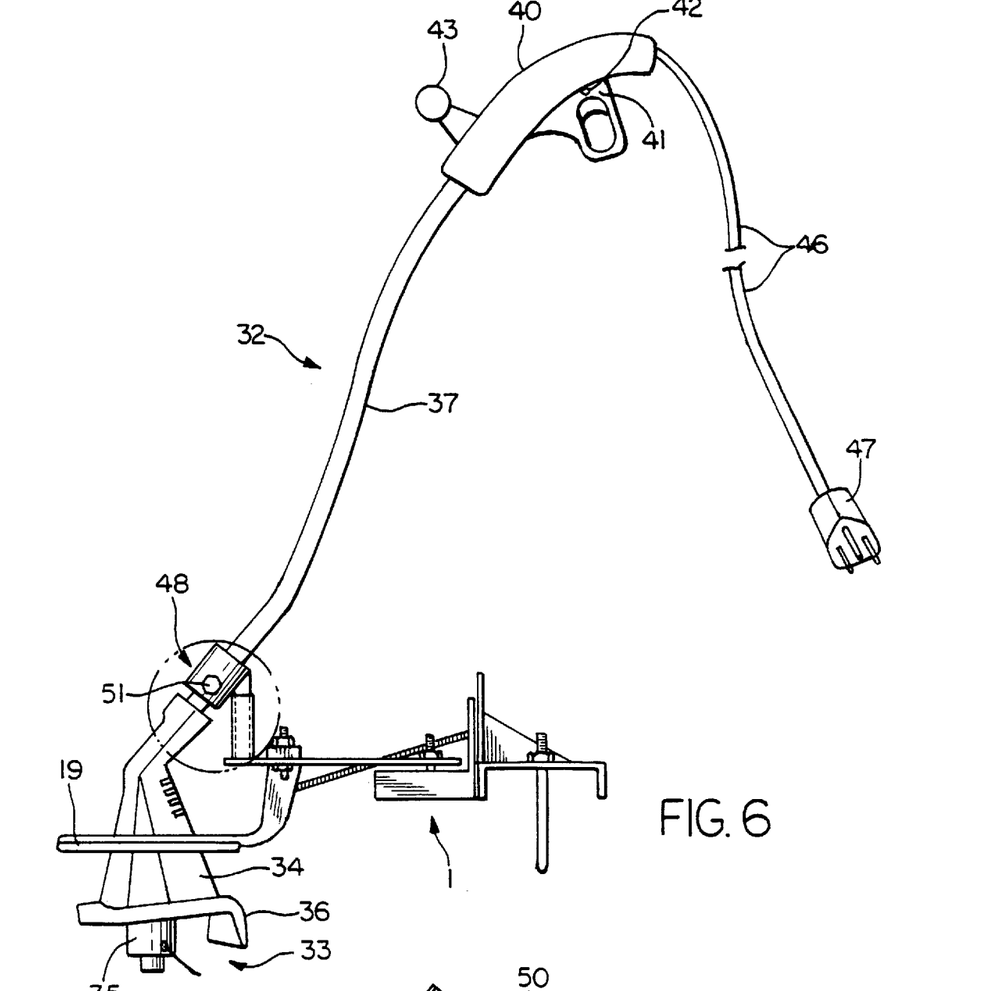
FIG. 6 is a full side view of FIG. 5.
Figure 7:
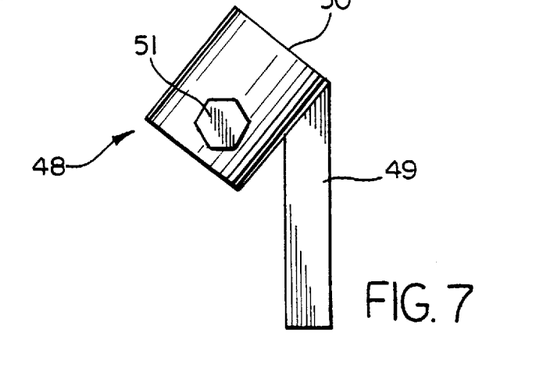
FIG. 7 is an enlarged view of the circled area of FIG. 6 and shows the mounting stake for the grass whip.

Turning now to FIG. 6, there is shown a full side view of the combination of the grass whip 32 and the mounting bracket 1, in which all of the like numbers denote like components. With further reference to FIG. 7, which is an enlarged view of the circled area of FIG. 6, there is shown a mounting stake 48 which is comprised of a stake 49, and a mounting head 50. The mounting head 50 has an opening (not shown) in the center thereof, to accommodate the elongated hollow tube 37 wherein the mounting head 50 surrounds the elongated hollow tube 37 and clamps tightly to said elongated hollow tube 37 by the use of a bolt 51, which stabilizes the mounting state 48 on the elongated hollow tube 37. In use, the stake 49 is inserted into the hollow tube 28 and seated therein (shown in phantom in FIG. 6, within the noted circled area). By this means, the grass whip 32 is securely mounted on the rotatable arm 17 and moves therewith.

Figure 8:
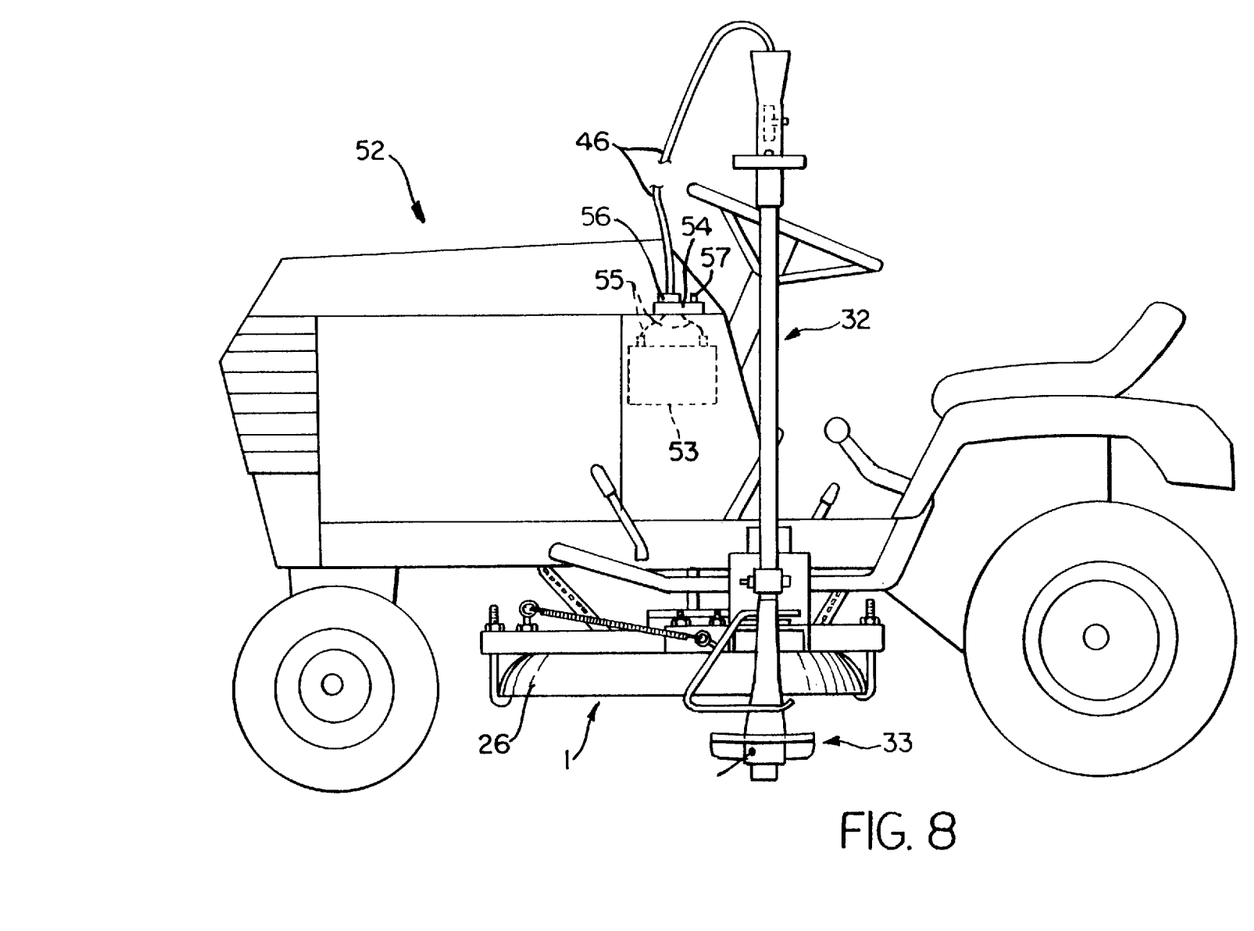
FIG. 8 is a full front view of a bracket of this invention, attached to a shroud of a lawn tractor, with a portable grass whip of this invention in place and attached to the tractor battery.

FIG. 8 shown a full side view of a mower tractor 52, with a full front view of the mounting bracket 1 of this invention, surmounted by a grass whip 32 of this invention, attached to the mower shroud 26. It should be noted that the grass whip 32 is attached by electrical cable 46 to a switch box 54 which is in turn connected by electrical cable 55 to, and powered by, the battery 53 of the tractor 52. The switch box 54 (see FIG. 9) is comprised of an electrical outlet connection 56 for the cable 46, an electrical switch 57, and the electrical cables 55.

In operation, when the tractor 52 is ready to mow the vegetation, the grass whip 32 is mounted in the mounting bracket 1, attached to the battery 53 by means of the electrical cord 46, the switch 1 is activated, and locked in the open position by the lock mechanism 42, and then the grass whip 32 is powered. As the mower moves along, the area of the lawn to be trimmed is subjected to the grass whip 32, it being understood that the grass whip 32 has pre-emptorily been adjusted to the correct mowing height. In using the grass whip 32 alongside immovable impediments such as basement walls, trees, shrubs, and the like, the mower is moved into position so that the left side of the tractor 52, the side on which the grass whip 32 is mounted in this case, is moved into the area to be trimmed. As soon as the stanchion 19 encounters an immovable object, the stanchion 19 is pushed backward along the shroud 26, stretching the spring 21, until the stanchion 19 moves past the immovable object.

While the stanchion 19 is so impacted, and because of the force on the stanchion 19 created by the stretched spring 21, the stanchion 19 lays against and follows the outside configuration of the immovable object and thus allows the grass whip 32 to trim adjacent to the object without injuring or impeding the grass whip 32. Upon passing the immovable object, the spring 21 returns to its normal resting position pulling the stanchion 19 and the rest of the grass whip 32 mechanism with it, thereby placing the mechanism in a position to meet the next immovable object. Thus, there is no need for the operator to have to manipulate or control the movement of the stanchion 19 and the grass whip 32 as it controls itself according to the configuration of the immovable object to be trimmed around.

It can be observed with reference to FIG. 8 that the invention is provided with an off/on switch 53, housed in a switch box 54. When the operator of the tractor 52 does not require the trimmer to be in the on position, the operator can simply switch the unit off by use of the switch 57.

Figure 9:
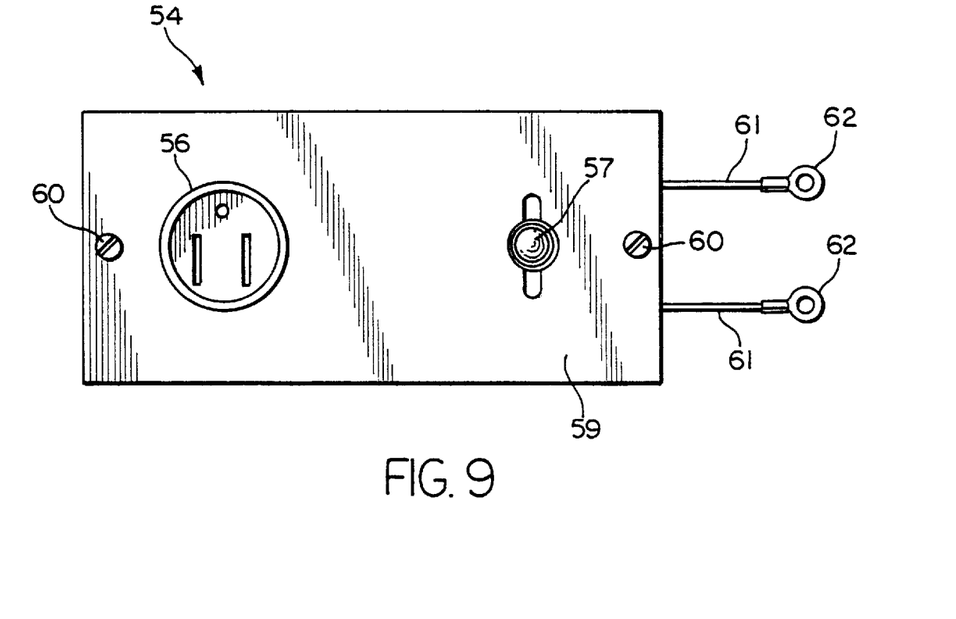
FIG. 9 is a full top view of the switch box of this invention.
Figure 10:
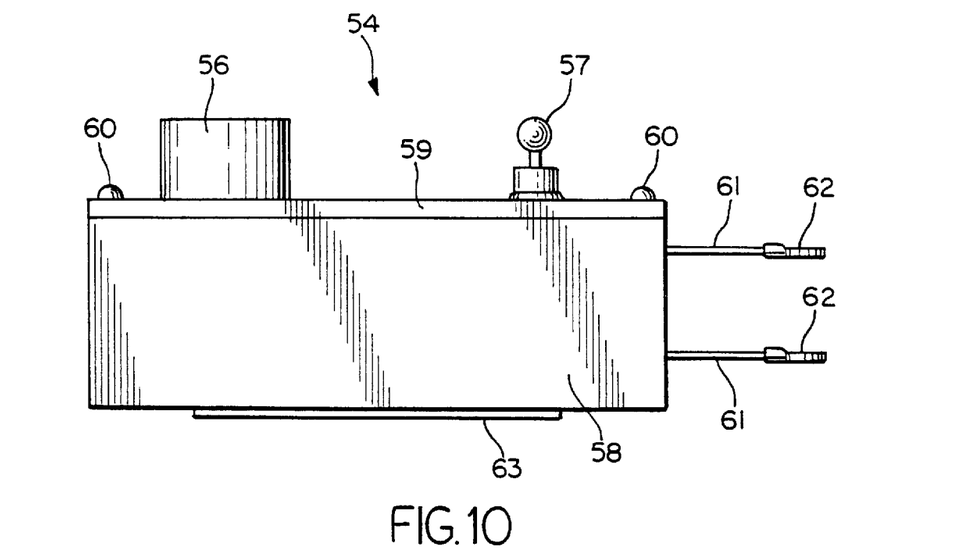
FIG. 10 is a full side view of the switch box of FIG. 9.

The switch box 54 is shown in FIGS. 9 and 10, which is a full top view and a full side view, respectively of the switch box 54. It is comprised of a plastic or metal box 58, having a lid 59, which is fastened to the box 58 by appropriate fasteners such as metal screws 60. The contents of the box 58 include a female connector 56, connected electrically to the switch 57, which switch 57 is connected electrically to the wire leads 61 which are equipped with some means of connecting to an electrical power source such as battery 53, for example, by metal clips 62. As illustrated in FIG. 10, the box 54 can be adhered to any convenient surface of the tractor 52 by the use of a pressure sensitive adhesive strip 63. However, it is contemplated within the scope of this invention to fasten by box 54 to the tractor 52 by any convenient means such as straps, screws, or bolts, or the like.

Figure 11:
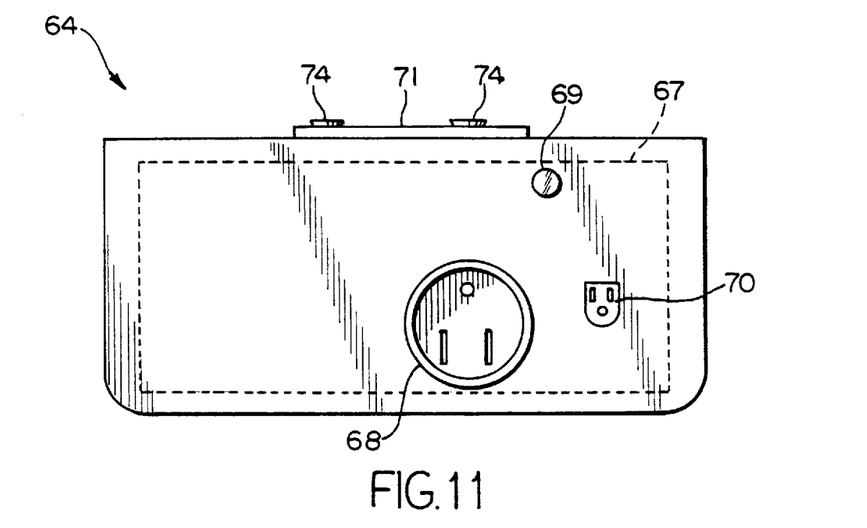
FIG. 11 is a full side view of a battery pack of this invention.
Figure 12:
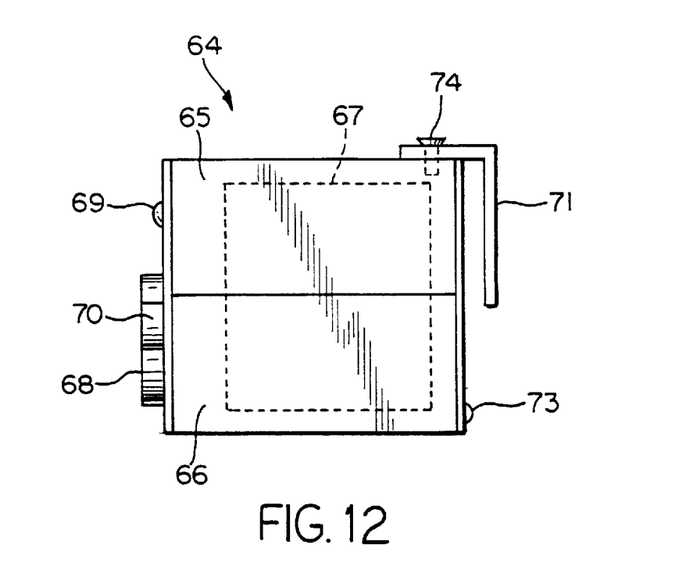
FIG. 12 is a full end view of the battery pack of FIG. 11.

When the operator finds the need to use the grass whip 32 away from the tractor 52, then there is provided a battery pack 64, as shown in FIGS. 11 and 12. The battery pack 64 is comprised of a plastic or metal box having, for purposes of illustration, two parts 65 and 66, which constitute the top and bottom, respectively of the battery pack 64. Housed within the battery pack 64 is a rechargeable battery 67 having connected to it a female electrical plug 68 (the electrical connection not shown as it is conventional). There is also included for convenience an indicator light 69 attached electrically to the electrical system of the battery, an electrical charger receptacle 70 for recharging the battery 67 from an independent electrical source, and a belt attachment 71, which allows the user to loop the attachment 71 over the belt of the person using the battery pack 64.

The battery pack 64 can be glued together, or can be fastened by the use of straps, bolts or screws, said screws 72 being illustrated at 73, while the belt attachment 71 should be securely fastened to the battery pack 64 by a bolt or screw 74, although it is contemplated within the scope of this invention to fasten the same with an adhesive.

Thus, when in use, the combination of the grass whip 32 and the battery pack 64 allows for the user to loop the belt attachment 71 over the user's belt, attach the electrical lead 46 to the female electrical outlet 68 using the electrical attachment 47, and carry both the battery pack 64 and the grass whip 32 to areas remote to the tractor 52.

Figure 13:
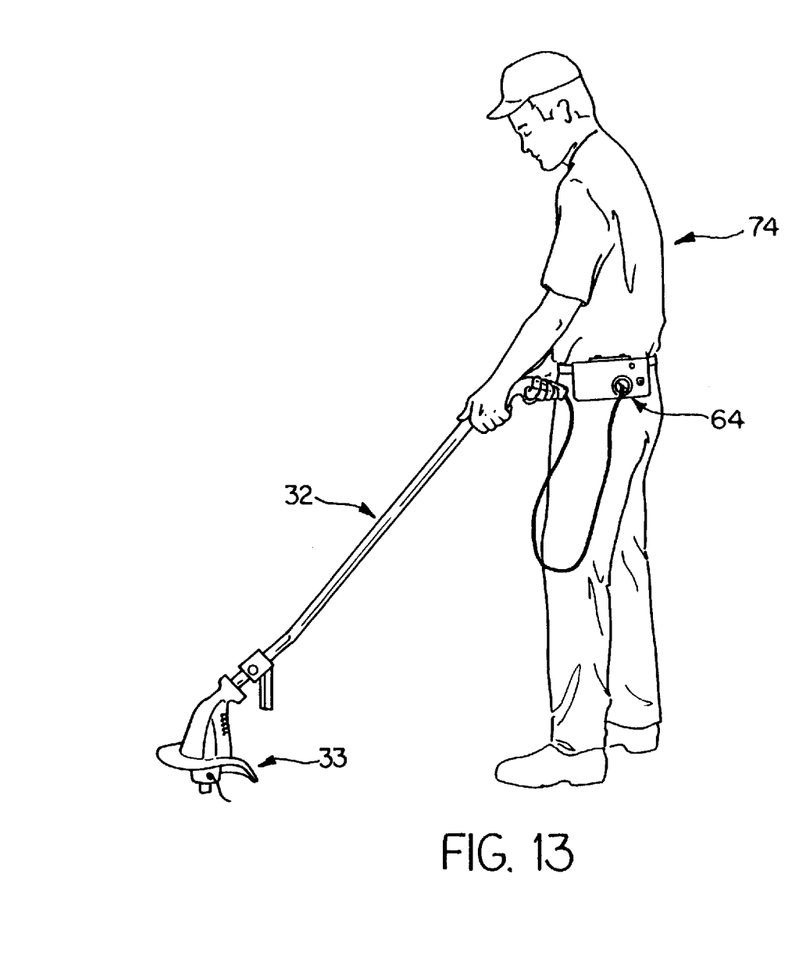
FIG. 13 is a full view of the combination of the grass whip and battery pack of this invention in use by an operator.
Figure 14:
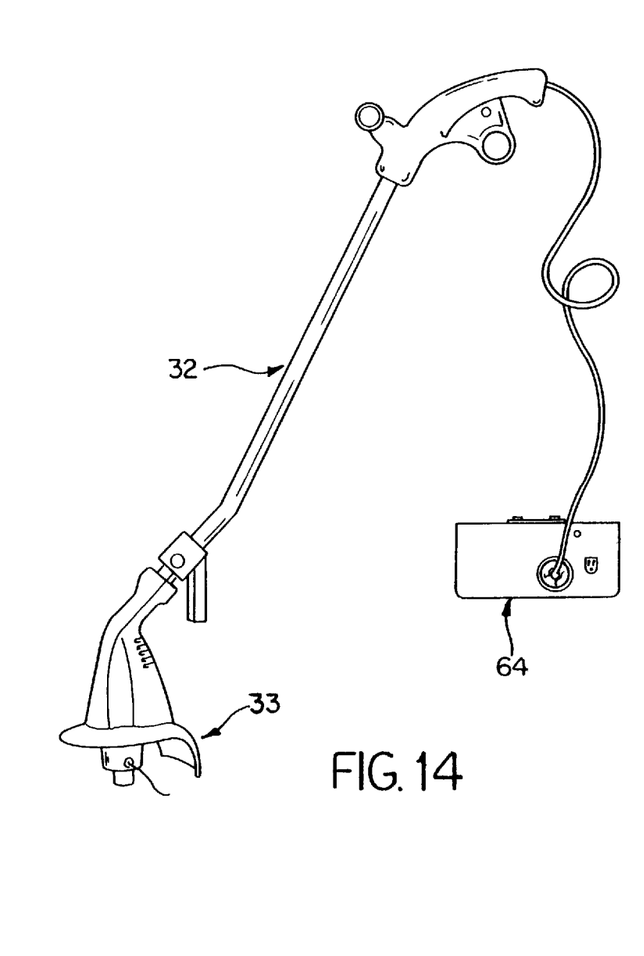
FIG. 14 is a full view of the combination of the grass whip and the battery pack.

Thus, FIG. 13 shows the use of the inventive apparatus wherein there is a user 74, the grass whip 32, and the portable battery pack 64 in combination while in use, while FIG. 14 illustrates the combination of only the grass whip 32 and the battery pack 64.

What I claim is:

1. A bracket for mounting a powered grass whip, said bracket comprising:

(A) a first base having a linear axis and a top planar surface;
   (B) a second base;
   (C) a rotatable arm having a near end and a distal end;
   (D) a stanchion;
   (E) a spring having a near end and a distal end, wherein the first base (A) includes means to attach said first base to a mower shroud;

said second base being surmountable attached on said first base and essentially at a right angle to the linear axis of the first base and essentially in the same plane as the top planar surface;

said rotatable arm being rotatably surmounted on and detachedly affixed to the second base at the rotatable arm near end;

said stanchion being fixedly surmounted on said rotatable arm at or near the rotatable arm distal end thereof, said rotatable arm having surmounted thereon at the rotatable arm distal end, a hollow post and said stanchion having connected thereto, the spring, said spring being connected at the spring near end;

the distal end of said spring being attached to the mower shroud or the first base at a point distant from the attachment point of the second base to the first base.

2. In combination, the bracket as claimed in claim 1 and a mower shroud.

3. The combination as claimed in claim 2 in which the mower shroud is additionally attached to a riding lawn mower.

4. In combination, the bracket as claimed in claim 1, additionally having a powered grass whip mounted on the post and movable essentially simultaneously with the stanchion when the stanchion is moved.

5. The combination as claimed in claim 4 wherein the powered grass whip comprises:

(i) a housing having a shroud;
   (ii) rotatably mounted within said housing, a motor to drive a whip, said whip being housed within the shroud;
   (iii) a hollow handle, said handle being mounted on the housing (i), said handle having a near end and a distal end, said handle having mounted thereon, near the near end, an adapter;

said hollow handle having a hollow carrying grip mounted on the distal end of the hollow handle thereof;

said motor being attached to an electric power source by a first cable, said first cable running from said motor, through said hollow handle, and on through said hollow grip and electrically attaching to a switch;

a second cable having a near end and a distal end and being electrically attached to said switch at the second cable near end, the distal end of the second cable being capable of attaching to a power source;

said adapter being capable of being detachedly mountable in the hollow post of the rotatable arm.

6. The combination as claimed in claim 5 wherein the power source is a battery.

7. The combination as claimed in claim 6 wherein the battery is a battery that powers the riding lawn mower.

8. The combination as claimed in claim 6 wherein the battery is a portable battery not used to power the riding lawn mower.

* * * * *